Nov. 23, 1926.

W. E. TRENT

POWER PLANT

Filed Sept. 27, 1919   5 Sheets-Sheet 2

Nov. 23, 1926. 1,608,446
W. E. TRENT
POWER PLANT
Filed Sept. 27, 1919   5 Sheets-Sheet 3

Inventor
Walter E. Trent
By Charles M. Thomas
Attorney

Patented Nov. 23, 1926.

1,608,446

UNITED STATES PATENT OFFICE.

WALTER E. TRENT, OF WASHINGTON, DISTRICT OF COLUMBIA, ASSIGNOR, BY MESNE ASSIGNMENTS, TO TRENT PROCESS CORPORATION, OF WASHINGTON, DISTRICT OF COLUMBIA, A CORPORATION OF DELAWARE.

POWER PLANT.

Application filed September 27, 1919. Serial No. 326,899.

The invention relates to improvements in power plants, and deals more particularly with the type of plant described in my Patent No. 1,505,662, and my copending application Serial No. 318,353, filed August 8, 1919.

In the latter application, above identified, I have shown a power plant of the continuous combustion type, comprising a fluid pressure generator and independently operable compressor and power units. The compressor unit in this disclosure is driven at variable speeds relative to the speed of the prime mover or power unit, so as to always supply the generator with the required quantities of air, fuel and water to build up sufficient pressure gases therein to operate the power unit with its variable loads at a constant speed. In this application both the engine for the compressor unit, and the prime mover receive an energy of a composite nature from the fluid pressure generator, and while this type of plant is highly advantageous under certain operating conditions, I have found that at times it is preferable to drive the compressor engine and the prime mover with separate energies of different characters that are both produced within the generator.

It is, therefore, an object of the present invention to provide a power plant embodying a generator and independently operable power and compressor units receiving fluid energies of different natures from the generator, one unit being driven by gaseous products of combustion alone, while the other unit is adapted to be driven by steam generated from the intense heat of the products burned in the combustion chamber.

With the foregoing conception in mind, the invention comprises a power plant having the compressor and power units in communication with a generator adapted to receive fuel, air and water upon the operation of this unit for the production of the separate fluid energies. The fuel and air enter the combustion conduit of the generator, while the water is conveyed through the combustion chamber and converted into steam by heat radiation to be then introduced to the compressor engine as a motive fluid. It will be understood that the products of combustion in the combustion chamber are kept entirely separate from the steam and these products are expanded in the prime mover for the generation of power.

It is a further object of the invention to provide a plant of this general character which is of a very compact structure, and one wherein the power unit and the engine for the compressor unit have separate and distinct exhaust pipes to enable the exhaust products from the power unit to be discharged into the atmosphere, while the exhaust steam from the compressor unit is introduced to a condenser, to be converted to water that is again conveyed to the generator.

The invention also comprises a power plant having both compressor and power units independently operable, in combination with automatically acting pressure responsive means for controlling the speed of the compressor unit in keeping with the load placed upon the plant. The pressure responsive means is actuated by the pressure gases produced in the generator and is adapted to open or close the steam feed pipe conveying steam from the generator to the compressor unit engine so as to vary the speed of this engine in keeping with the pressure of the gaseous products produced in the generator for power purposes. It will be understood that the fuel, water and air delivered to the generator by the operation of the compressor unit are always in definite ratios, but are in variable quantities as may be needed to build up the necessary energy in keeping with the demand placed upon the power unit.

In a preferred embodiment of the invention, the compressor cylinders and power cylinders are provided with water jackets through which water from the condenser passes to absorb any heat that may radiate through the cylinder wall so as to be preheated prior to its introduction to the generator. It will be understood that the water not only absorbs the heat of the products of combustion and steam in the different engine cylinders, but also absorbs the heat of compression so that when introduced to the water chamber of the generator the same is in a highly heated condition. The generator is provided with air and water chambers surrounding the combustion chamber, the air being introduced to the combustion chamber with its fuel to promote combustion therein, while the water chamber is in communication with a water coil passing through the combustion chamber to convert the water introduced to the generator into steam which is then delivered to the compressor engine for driving the compressor unit.

One of the salient features of the present invention comprises a method of treating the air and oil introduced to the generator for the production of pressure gases by conveying two or more separate streams of air through a zone of heat one or both of which may contain fuels in such ratios in proportion to the quantity of air that the mixture may be subjected to intense heat, yet because of the improper mixture formed, the individual streams will not burn until they have been united to produce a combustible charge containing the proper ratio of fuel and air to cause combustion. In following this method it will be understood that should two air streams be superheated prior to the burning of a combustible charge, one of these streams may be exceedingly rich in fuel and the other decidedly lean while being conveyed through the combustion chamber to intensely heat the air and fuel thereby rendering the same in such a condition as to be instantly consumed when the separated streams are united at a point adjacent the entrance to the combustion chamber. One air stream could, if desirable, be entirely free of fuel when undergoing its heat treatment, and the other would, in that event, contain a large volume of oil or fuel which is to undergo treatment with the air to prepare it for burning by being conveyed through the combustion chamber, but manifestly because of the rich condition of the mixture this air and oil will not burn regardless of the temperature attained until brought into association with the other stream of air which two streams are so regulated with respect to relative quantities of air and fuel as to produce when united a highly combustible mixture.

Combustion is greatly facilitated if the combustible elements such as the fuel and air are thoroughly superheated, and this method not only contemplates the heating of these elements when associated, but has in mind a method of treating the air and the oil separately, which consists in intensely heating both of these agents by conveying the same through a heating chamber to vaporize the oil and intensely heat the air, so that when the intensely heated air and oil are brought into association a highly combustible mixture is produced which instantaneously burns.

In the accompanying drawings I have shown a preferred embodiment of the invention, but this disclosure is merely for the purpose of illustration and it will be understood that many changes in construction and arrangement of parts may be clearly made without departing from the scope of the appended claims.

In the drawings.

Figure 2 is an end view of the plant.

Referring now more particularly to the drawings wherein like reference characters indicate corresponding parts, the numeral 1 designates a fluid pressure generator having an outer shell 2 provided with an integral end portion 3, and a down turned flange 4 at its opposite end. Disposed within the outer shell 2 and spaced therefrom is a cylindrical metallic shell 5, which has down turned flange portions 6, the inner flange being secured to an end plate 7 by rivets or the like. There is also disposed within the generator a third shell or cylindrical member 8 which is spaced from the member 5 and is formed with a down turned flange 9 at one end, and an up turned flange 10 at its opposite end. A suitable ferrule or end member 11 is disposed in the end of the generator opposite the end plate 3, this member having a flange portion 12 and an inwardly extending part 13 having perforations 13' therein and formed with a down turned flange 14. A closure plate 15 is disposed over the member 11 and constitutes one of the end walls for the generator.

Figure 6:
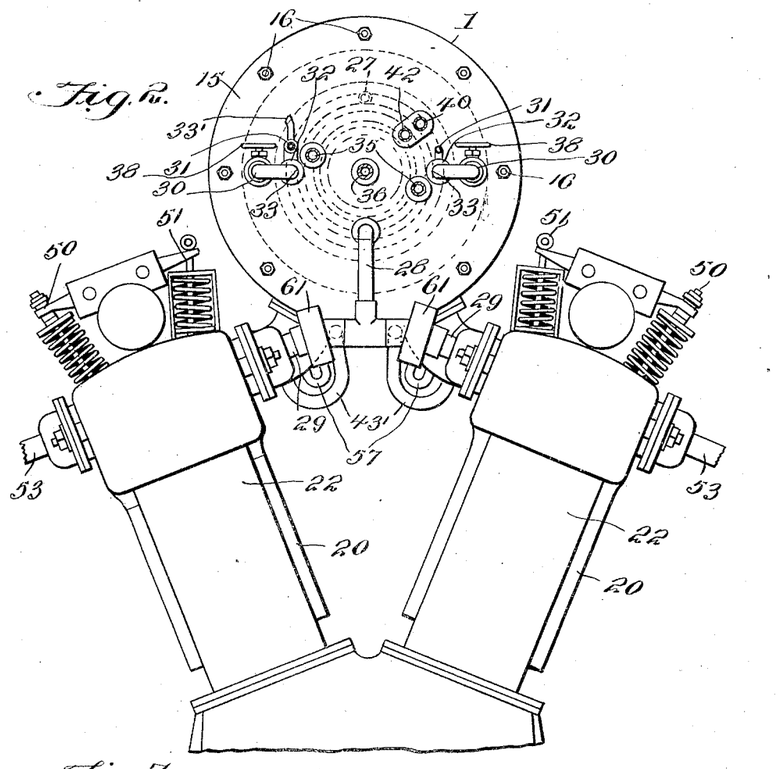
Figures 6, 7 and 8 are detailed views, partly in section, of portions of the apparatus.
Figure 7:
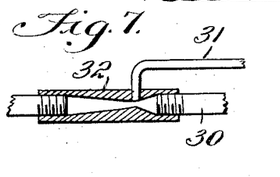
Figure 8:
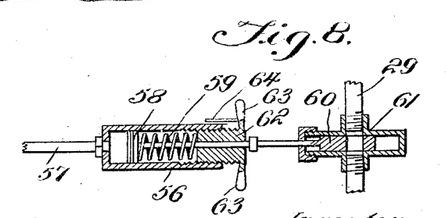

The different elements of the generator are specifically shown in Figure 6 in an unfastened and separated condition, but it will be understood that when the parts are to be assembled, suitable fastening bolts 16 are employed to unite the different flange portions of the members, and this construction of a generator is highly desirable inasmuch as it permits the parts to be readily associated or to be removed in case a replacement is necessary. By spacing the shells or walls 2, 5 and 8, water and air chambers 17 and 18 respectively are provided that surround the combustion chamber 19 of the generator and are adapted to receive air and water supplied by the compressor unit of the plant to be now described.

Disposed adjacent the generator on each side thereof is a compressor unit, and as both of the units are of a like construction, a description of one will be given, it being understood that like reference characters apply to similar parts of the other unit and that the said units are identical in operation. In many types of plants the use of but a single compressor unit may be needed, and manifestly only one unit need be employed where such is desirable. Each compressor unit comprises an air compressor cylinder 20 having the usual air controlling valves therein and a reciprocating piston for delivering air to the air chamber 18 of the generator 1. The compressor unit also is provided with a water pump 17' having a suitable water inlet 18' leading thereto and a water outlet communicating with the compressor jacket so that an operation of the compressor unit causes both the water and air pumps to be simultaneously placed into operation. The water introduced to the water pump is supplied from the condenser or radiator that will be more fully hereinafter referred to, but it may be stated that the present compressor unit in so far as the water and oil pumps are concerned is substantially the same in formation as the construction disclosed in my pending application, Serial Number 318,353.

Figure 1:
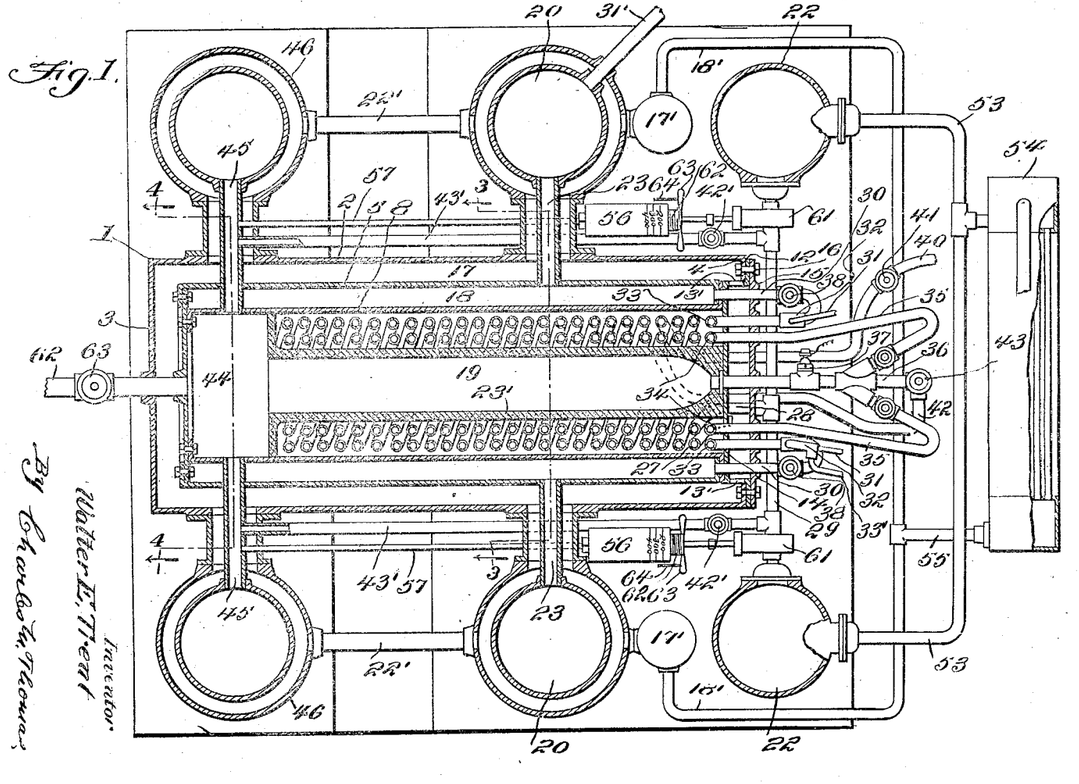
Figure 1 represents a diagrammatic view of the apparatus.
Figure 3:
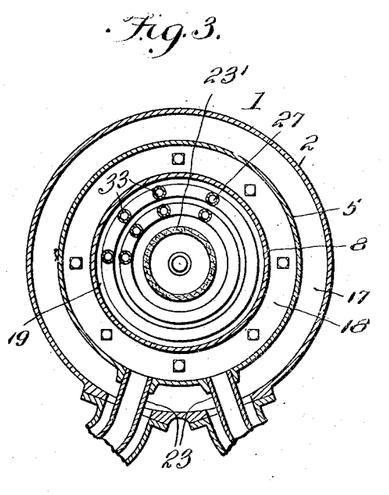
Figures 3 and 4 are sectional views as indicated by the lines 3—3 and 4—4 of Figure 1.
Figure 4:
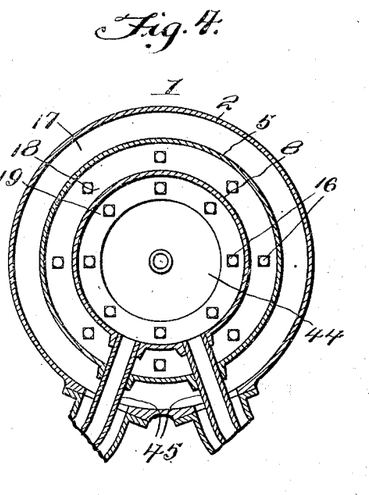
Figure 5:
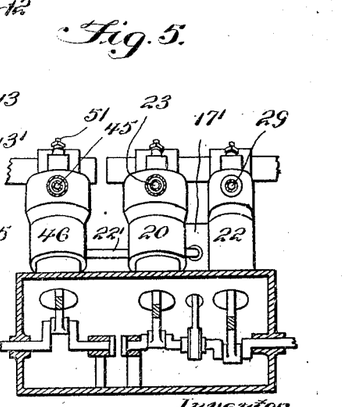
Figure 5 is a side elevation of a portion of the device with parts in section.
Figure 9:
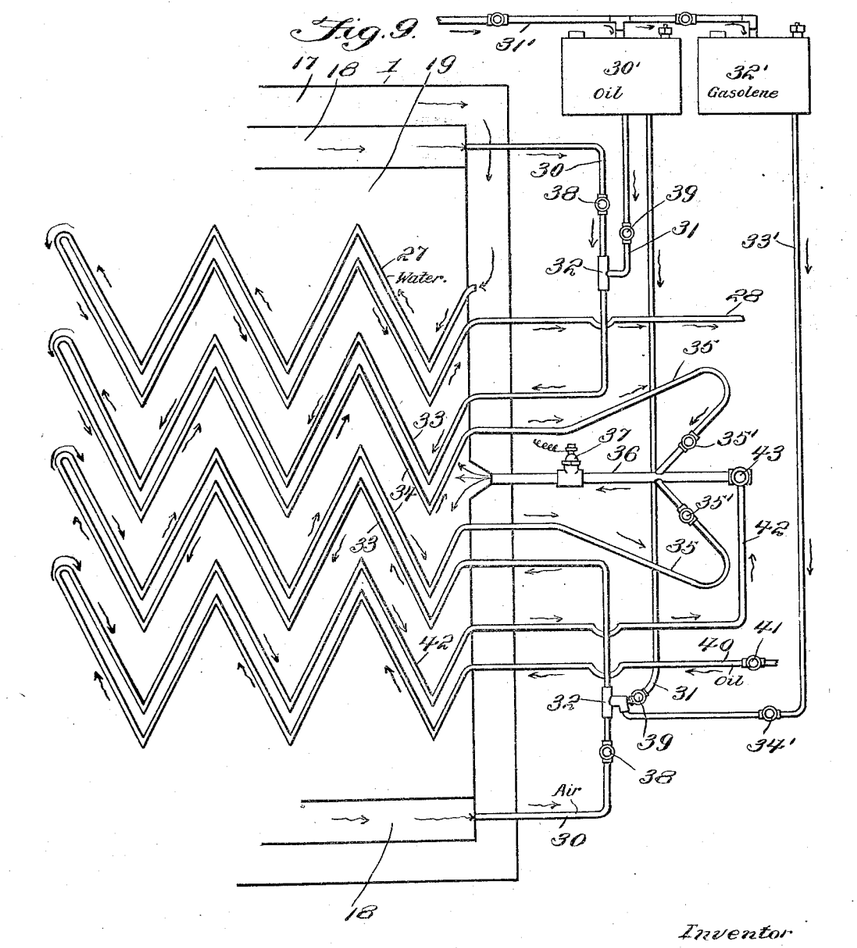
Figure 9 is a diagrammatic view showing the course of the air, water and oil through the combustion chamber.
Figure 10:
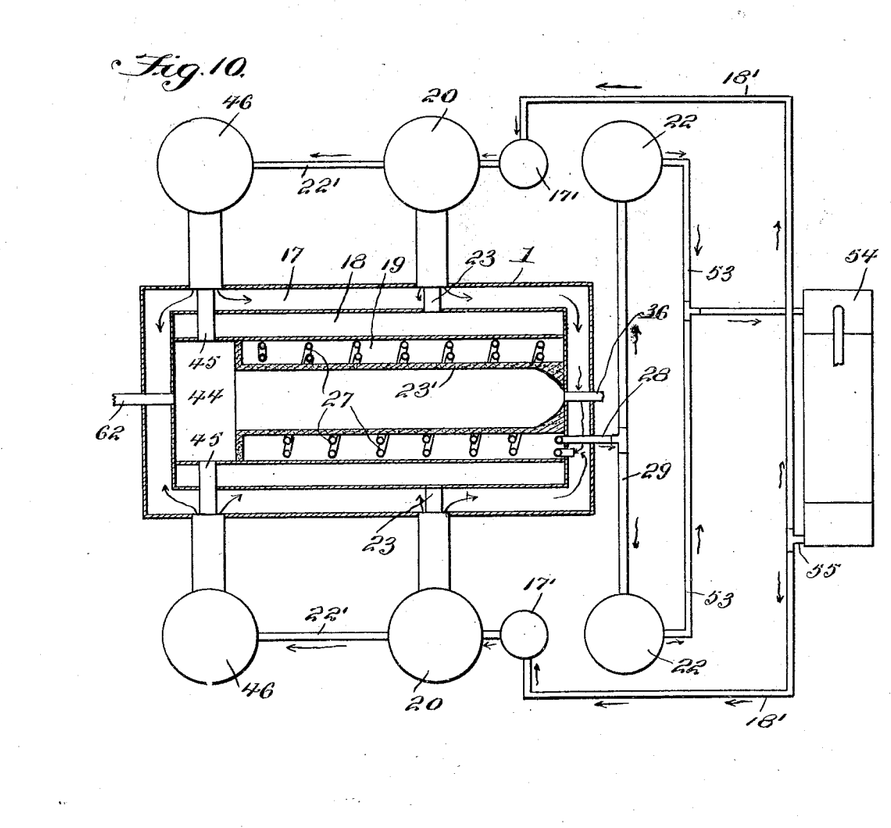
Figure 10 is a diagrammatic view of the apparatus with parts in section.

As shown in Figure 5 of the drawings, the power unit shaft is separated from the crank shaft of the compressor unit, the compressor unit in the present invention being driven through the medium of a steam engine 22 receiving its supply of steam from the generator in a manner which will later appear. The operation of the compressor unit causes air to be introduced through the air conveying pipes 23 directly to the air chamber 18 of the generator, while water is also conveyed from the water pump in measured quantities to the compressor jacket and the jackets of the power cylinders by the water conducting conduit 25 surrounding the energy conveying pipe leading from the generator to the power cylinders and the air inlet pipe established in communication between the air compressors and the air reservoir of the generator, a conducting pipe 22' being interposed between the water jackets and the compressor and the power cylinders to enable the water to be conveyed from one to the other. The water thus introduced to the generator has been previously heated by absorbing the heat of compression developed by the air compressor as well as the heat radiating through the power cylinders, and when in this preheated condition passes on to the water jacket 17 of the generator from where it is conveyed by the water conducting coils 27, clearly shown in Figure 9, entirely through the combustion chamber and then back to the same side of the generator as the water was introduced thereto. The combustion chamber is provided with a relatively thin liner 23' extending therethrough and interposed between the chamber 19 and the coils so as to prevent intense heat from attacking and destroying the coils. This liner, however, is of such a nature to allow sufficient heat to pass therethrough to thoroughly heat the substances passing through the coils in the combustion chamber.

This heat treatment manifestly converts the water into steam as the same absorbs the intense heat of the products of combustion at the time of their generation and the converted steam produced in the coils then passes through the steam conveying pipe 28 communicating with the pipe 29 which leads to each of the steam cylinders 22 constituting the operating engines for the compressor units.

The air that has been introduced to the air chamber 18 serves to absorb any heat that may radiate from the combustion chamber so that the outer shell of the generator is always substantially cool, and this heated air is withdrawn from the chamber through the pipe 30, two being shown for the purpose of disclosure, but manifestly any number may be used in keeping with the necessities of the plant. The air passes through the pipes 30 together with a fuel which may be oil, powdered coal, or the like, fed thereto through the fuel feeding pipes 31 which communicate with the venturi 32, which venturi serves to increase the velocity of the air passing therethrough and to cause the oil or other fuel to be picked up by the air and conveyed as shown by the diagrammatic showing Figure 9, through the combustion chamber in the coiled pipes 33 and then back through the pipes 34 to the discharge pipes 35 communicating with the relatively large firing chamber or conduit 36 that is common to both of the air conducting pipes 30. The fuel supplied to the fuel feeding pipes 31 is contained within a fuel receptacle 30' having the two discharge pipes 31 shown therein, and this fuel is fed to the air passing through the air feeding pipes 30 by reason of air pressure exerted on the fuel in the tank 30'. Compressed air from the compressor unit passes through the pipe 31' from the air compressor to the fuel tank 30', it being manifest that if the operation of the compressor is such that will cause a large quantity of air to be delivered to the air conveying pipes 30 for treatment, then a quantity of air of such a pressure as to cause a predetermined volume of fuel to enter the air pipes 30 through the fuel conducting pipes 31 is introduced to the fuel tank 30'. Another fuel tank 32' is also disclosed, the same having a fuel conveying pipe 33' controlled by the valve 34' leading from the tank 32' to one of the air feeding pipes 30, this tank being adapted to contain a relatively large supply of hydrocarbon fuel such as gasoline or the like that is used in starting the plant, but when the combustion chamber becomes heated, the valve 34' is closed so that all the fuel is fed from the tank 30'.

The air passing from the chamber 18 of the generator through the air conducting pipes 30, as before stated, receives its fuel by reason of the fuel feeding pipes 31 and in carrying out the present invention it should be understood that a definite quantity of fuel which will, for instance, produce with the air passing through one pipe a decidedly lean mixture is introduced to this air steam, while a quantity of fuel which will produce with the air passing through the other pipe a very rich mixture is introduced to the other air steam so that the combined air and fuel can be given a very thorough heat treatment so as to place the mixture in condition for burning prior to its introduction to the firing chamber, yet at the same time, the different air and fuel streams contain such relative quantities of air and fuel as to prevent them from burning regardless of the intense heat treatment that may be given. The mixture passing through one pipe being lean, while the mixture pasing through the other pipe is decidedly rich, no explosion or burning will occur when these mixtures become very hot until the two streams come into association in the common firing chamber 36 which results in a formation of a thoroughly combustible charge that is immediately ignited by the spark plug 37, thus producing gaseous products of combustion that enter the combustion chamber 19. When the air and fuel that is to produce the pressure gases are split in the two or more streams as above indicated, it will be understood that the relative quantities of fuel and air are so proportioned as to produce a highly explosive mixture when all of the air and fuel is brought into a common association, but as has been previously pointed out, the air streams are split and carried in proper ratios of air and fuel so that a combustible charge is not formed and no danger of premature explosion occurs when the streams are being given their heat treatment.

When starting the plant, the spark plug 37 in circuit with any source of electric supply is used, but when the firing chamber becomes sufficiently heated to carry on combustion without the use of the spark plug, the electric current may be broken and the intense temperature of the air and fuel when brought together in the heated mixing intake pipe or firing chamber 36 will result in the combustion of the same at or near the entrance of the pipe 36 to the combustion chamber 19. When the generator is started a small flow of air and fuel travelling at a low velocity is introduced to the firing chamber 36 and under this condition the mixture is in a proper state to be burned at the spark plug, but when the generator is sufficiently hot and a large amount of air and fuel is introduced at a high velocity because of the operation of the compressor unit, combustion, as a rule, does not take place until the air and fuel are near the entrance of the combustion chamber, therefore the spark plug being located outside of the generator, while answering all purposes for starting the operation of the plant, is in a zone or location where it will not be affected by the flame of the products of combustion. It will be understood that one of the air conducting pipes 30 may contain the entire quantity of oil that is to be used in the generation of the pressure gases, while the other pipe will only convey pure air through the combustion chamber, in which event, the separate streams of air and air and fuel will be given a proper heat treatment before they associate with each other to form a combustible mixture in the common firing chamber 36. There are disposed within the air conducting pipes suitable adjustable valves 38 for controlling the quantity of air that is to pass through the combustion chamber to be later used in supporting combustion, while similar valves 39 are located within the oil feeding pipe 31 to accurately control the quantity of oil admitted to the air streams.

At times it may be preferable to separately preheat the air and the oil, and this can be accomplished by conveying pure air through the air feeding pipes 30' through the combustion chamber to intensely heat the same, which air is to be discharged through the pipes 35 controlled by the valves 35', while oil in its pure condition is introduced through the pipe 40 controlled by the valve 41 directly through the combustion chamber and returned by the pipe 42 to the common conduit 36. This incoming oil has been thoroughly treated and instantly mixes with the highly heated air so that a combustible charge is produced and burns immediately. A valve 43 is disclosed in the fuel feed pipe 42 so that the flow of fuel after having been heated can be accurately controlled to produce a proper mixture of air and fuel.

The products of combustion accumulating in the combustion chamber 19 pass through into the header 44 and out through the conducting pipe 45 to the cylinder 46 constituting the power unit or prime mover of the plant. These products are intensely hot and when they enter the cylinder 46, of course expand to develop the necessary power. As has been pointed out, the steam generated in the coils passing through the combustion chamber is kept separate from the products of combustion and this steam is introduced into the pipe 29 to the steam cylinders 22 that serve to drive the air compressor 21.

The compressor engines 22 are driven by the steam which is of a pressure as a general thing different from the pressure of the gaseous products of combustion produced in the generator and conveyed through the power cylinders. However, it will be understood that should the supply of steam introduced to the steam cylinders 22 by the pipe 29 drop to such a pressure as to not operate the steam cylinders at the desired rate of speed necessary to supply the required quantities of air, oil and fuel to the generator, valves 42' disposed within the pipes 43' communicating with the steam conveying pipes 29 and the gaseous products of combustion conducting pipes 45 may be opened so as to equalize the pressure, if this is necessary, and to allow some of the products of combustion to pass through the pipes 43' and in through the steam pipe 29 to assist in operating the steam cylinders at that rate of speed necessary to supply the proper quantities of air, water and a fuel. On the other hand, should the pressure of the steam be greater than that of the gaseous products of combustion, then an opening of the valve will allow the excess steam to pass on through the pipes 43' to the pipes 45. Ordinarily the valves 42' are closed but they are only opened when an equalizing pressure is desired.

When the products of combustion have expanded in the power cylinders 24, the same are discharged through the exhaust valves 50 to the atmosphere or the like, it being understood that the compression gases are introduced to the power cylinders by means of the inlet valves 51. The valves for the power cylinders are the same construction as disclosed in my application #290,797, and are operated in the same manner. While I have shown two power cylinders in the present disclosure, it will be understood that any number may be used without departing from this invention.

The steam entering the steam cylinders 22 after expanding therein is discharged into the exhaust pipes 53 and conveyed to the condenser 54 where it is converted into water and again introduced to the compressor and cylinder jackets through the conveying pipe 55 leading from the lower part of the condenser.

The present invention contemplates pressure responsive means for always supplying through the generator sufficient air to build up an energy capable of driving the prime mover at a constant speed under variable and fluctuating loads. With this in mind, there are disposed adjacent the steam cylinders 22 fluid pressure regulators 56, and inasmuch as both regulators are of the same construction, a detailed description of one will be given. Communicating with the regulator 56 is a pipe 57 leading to the energy conducting pipe 45 for conveying the gaseous products of combustion from the generator 19 to the power cylinders 46, the pressure gases passing through this pipe and exerting an influence on the under side of the piston 58 disposed within the regulator. The piston 58 is normally urged downwardly by the coil spring 59 acting in opposition to the pressure gases entering the regulator, and connected with the piston is a suitable gate valve 60 disposed within a housing 61 surrounding the steam conducting pipe 29 so that an actuation of this valve either opens or closes the passage of steam through the pipe to the steam cylinder. The tension of the spring 59 is adjustable by means of the adjustable head 62 having grasping portions 63 to permit the same to be readily turned and a suitable indicator 64 movable over graduation marks on the regulator 56 to designate the pressure of the fluid gases necessary to actuate the piston. Should the pressure of these gases drop because of a sudden load being placed upon the prime mover, the spring 59 then overcomes the tension of the pressure gases moving the valve 60 downwardly so as to permit more steam to pass to the steam cylinders 22 increasing the speed of the compressor engines and causing additional supplies of air to be introduced to the generator. An increased quantity of oil is likewise introduced and this oil preferably is of a definite predetermined quantity so that the proper volumes of air and oil are always introduced to the generator in definite ratios. Should, however, the pressure in the generator become excessive, the engine speed is maintained constant by reason of the raising of the piston 58 in the regulator 56 against the tension of its spring causing the gate valve 60 to be slightly closed thereby admitting less steam to the steam cylinders which results in a corresponding quantity of air and oil being delivered to the combustion chamber.

Leading from the wall of the header 44 of the combustion chamber is a conveying pipe 62' having a suitable valve 63' therein by which products of combustion may be taken to a distant point for the operation of engines and the like, should this be desirable, and it should also be observed that when starting the engine, the opening of the valve 63 relieves the pressure of the generator so that only atmospheric pressure is encountered when the oil and air is being delivered to the generator for burning.

In the accompanying drawings, I have shown a preferred embodiment of this invention, but I wish it to be distinctly understood that many changes in construction, arrangement and combination of parts may be made without departing from the spirit of the same.

Having thus described the invention, what I claim is:

1. The method of producing pressure expansive fluids which consists in conveying separate streams of air through a heat chamber, in injecting fuel to each of said streams in such proportions as to cause one stream to be rich and the other lean to prevent combustion while the mixtures are undergoing a heat treatment, and in then bringing the separated streams together to form a combustible mixture possessing the proper relative quantities of air and fuel.

2. The method of producing pressure gases which consists in conveying separate streams of air through a heat chamber, in injecting fuel to each of said streams in such proportions as to cause one stream to be rich and the other lean to prevent combustion while the mixtures are undergoing a heat treatment, and in then bringing the separated streams together to form a combustible mixture possessing the proper relative quantities of air and fuel for burning to produce pressure gases.

3. The method of producing motive fluids which consists in subjecting to a heat treatment air in separated streams, in introducing fuel to one of the streams in such proportions as to form a mixture incapable of burning, and in then bringing the two streams together to form a combustible mixture.

4. A power plant comprising a compressor unit and a prime mover independently operable of said unit, a generator having a communication with the compressor unit, means for producing separated energies in the generator of different character and of different pressures, means for separately expanding one of the energies in the compressor unit engine and the other in the prime mover, and means for equalizing the pressure of the two separated energies by admitting the portion of one energy to the other.

5. A power plant comprising a compressor unit and a prime mover independently operable of said unit, a generator having a communication with the compressor unit, means for producing separated energies, in the generator of different characters and of different pressures, means for separately expanding one of the energies in the compressor unit engine and the other in the prime mover, and means for equalizing the pressure of the two separated energies by admitting the portion of one energy to the other, said means comprising a valve controlled connection between the steam conveying pipe and the gaseous products of combustion conducting passage.

6. A power plant comprising a compressor unit including an air compressor and its engine and a power unit independently operable of said compressor unit, a generator having a communication with the compressor unit, means for producing separated energies of different characters in the generator, means for conveying one of the energies to the compressor unit engine for expansion and the other to the power unit, and means responsive to the pressure of the energy conveyed to the power unit for controlling the speed of the engine of the compressor unit.

7. A power plant comprising a compressor unit including an air compressor and its engine and a power unit independently operable of said compressor unit, a generator having a communication with the compressor unit, means for producing separated energies of different characters in the generator, means for conveying one of the energies to the compressor unit engine for expansion and the other to the power unit, and means responsive to the pressure of the energy conveyed to the power unit for controlling the speed of the engine and the compressor unit, said means including a valve disposed within the compressor unit engine feed line, and resilient means normally urging said valve in opposition to the pressure of gaseous products of combustion.

8. A generator of the character described comprising a combustion chamber and a water and air reservoir surrounding said chamber, means for feeding water to the water reservoir, an air compressor for delivering air to the air reservoir, means for feeding fuel to the generator, means for conveying the air and water from their respective reservoirs through coils passing through the combustion chamber to convert the water into steam and to preheat the air.

9. A generator of the character described comprising a combustion chamber for receiving gaseous products of combustion, an air and a water reservoir surrounding said chamber, a compressor for feeding air to said reservoir, air conducting pipes leading from the air reservoir through said generator, means for feeding a fuel to the air passing through said conducting pipes to be carried through the combustion chamber with the air, and a common firing chamber into which said air and fuel conducting pipes lead for receiving the air and fuel after heat treatment, said firing chamber being in communication with the combustion chamber.

10. In a generator of the character described, air conducting pipes adapted to pass therethrough, means for feeding air to said pipes, means for feeding a fuel to the air to be carried through the generator with the air in separate streams, a common receiver adjacent said generator and into which said air conveying pipes lead for receiving the air and fuel after its passage through the generator to be burned therein and produce products of combustion for expansion.

11. In a generator of the character described, air conduction pipe adapted to pass therethrough, means for feeding air to said pipes, means for feeding a fuel to the air to be carried through the generator with the air in separate streams, a common receiver adjacent said generator and into which said air conveying pipes lead for receiving the air and fuel after its passage through the generator to be burned therein and produce products of combustion, means for conveying water through said generator to produce steam, and separate engines for expanding the products of combustion and steam.

12. In a generator of the character described, air conducting pipes adapted to pass therethrough, means for feeding air to said pipes, means for feeding a fuel to the air to be carried through the generator with the air in separate streams, a common receiver adjacent said generator and into which said air conveying pipes lead for receiving the air and fuel after its passage through the generator to be burned therein and produce products of combustion, means for conveying water through said generator to produce steam, and separate engines for expanding the products of combustion and steam, one of said engines constituting a prime mover and the other a compressor unit engine for supplying air to the generator.

13. The method of producing motive expansive fluids, which consists in subjecting to a heat treatment separate fluid streams of a non-combustible composition, and in then bringing said streams together to form a combustible mixture containing the proper ratio of fuel and air for burning to produce expansive products of combustion.

14. The method of producing motive fluids, which consists in subjecting separate streams of air and fuel in relatively non-combustible proportions to an intense heat treatment, and then bringing the two streams after their heat treatment together in a common receiver to form a mixture containing proper ratio of fuel and air to provide a readily combustible charge to be burned for the production of expansive gases.

15. The method of producing expansive fluids which consists in subjecting to a heat treatment separate streams of fuel and air, said streams each being of a composition that when separated, will not undergo combustion while being subjected to a high heat and of a composition which, when united in a common stream, will form a highly combustible charge, and in bringing said streams together to form the combustible charge for the production of an expansive energy.

16. A generator of the character described comprising air conducting pipes disposed therein, means for feeding a stream of air to said pipes, means for feeding a stream of fuel to the air passing through said pipes in quantities capable of forming a mixture of a relatively non-combustible composition, and a common means for receiving the air and fuel after its passage through said pipes to allow said streams to unite and form a combustible charge to be burned for the production of an expansive energy.

17. A generator of the character described, comprising a combustion chamber, fluid conducting conduits passing through said chamber, means for admitting charges to each of said conduits of a relatively non-combustible composition to be subjected to a heat treatment while passing through the combustion chamber, and a common means for receiving said charges to permit the separated streams to commingle and form a combustible charge to be burned in the combustion chamber to produce a motive fluid.

18. A generator of the character described, comprising a combustion chamber, fluid conducting conduits passing through said chamber, means for admitting charges to each of said conduits of a relatively non-combustible composition to be subjected to a heat treatment while passing through the combustion chamber, and a common means for receiving said charges to permit the separated streams to commingle and form a combustible charge to be burned in the combustion chamber to produce a motive fluid, in combination with an engine, and means for expanding said fluid in the engine.

19. In a generator of the character described, the combination with fluid conducting pipes, means for feeding air to said pipes, means for feeding a fuel to the air to be carried to the generator in separate streams in said pipes, a common receiver for said fluids after their passage through the generator wherein said fluids are burned to produce products of combustion, means for generating steam from heat absorbed from said products and separate engines for expanding the products and the steam.

20. A power plant comprising a compressor unit, and a prime mover, independently operable of said unit, a generator having a communication with the compressor unit, means for producing separated energies in the generator, means permitting a separate expansion of said energies in the compressor unit engine and the prime mover, and equalizing means for admitting a portion of one energy to the other, substantially as described.

21. A power plant, comprising independently operable units, a generator in communication with each of said units, means for introducing separated expansive fluids from the generator to each unit, and equalizing means for admitting a portion of the expansive motive fluid intended for introduction from one unit to the other unit.

In testimony whereof I affix my signature.

WALTER E. TRENT.